April 8, 1930.　　　F. L. FULLER　　　1,753,288
CASH REGISTER
Original Filed Nov. 19, 1918　　6 Sheets-Sheet 1

INVENTOR
Frederick L. Fuller
BY
ATTORNEY

April 8, 1930.  F. L. FULLER  1,753,288
CASH REGISTER
Original Filed Nov. 19, 1918   6 Sheets-Sheet 6

INVENTOR
Frederick L. Fuller
BY
A. A. Wicks
ATTORNEY

Patented Apr. 8, 1930

1,753,288

UNITED STATES PATENT OFFICE

FREDERICK L. FULLER, OF ILION, NEW YORK, ASSIGNOR TO REMINGTON ARMS COMPANY, INC., A CORPORATION OF DELAWARE

CASH REGISTER

Original application filed November 19, 1918, Serial No. 263,125, and in Great Britain September 12, 1919. Divided and this application filed April 27, 1926. Serial No. 104,939.

This invention relates to cash registers in general and has particular relation to locking and controlling mechanisms therefor.

This application is a division of the co-pending application of FREDERICK L. FULLER, Serial Number 263,125 filed November 19, 1918, to which reference may be had for a more complete description of one cash register to which the present invention has been applied. However, while the improvements set forth in this application are shown applied to a particular type of cash register illustrated in the parent application, their utility is by no means limited to this specific embodiment. The improvements are of such a nature that they may be applied in various modifications to many other kinds of cash registers and accounting machines.

It is among the objects of the present improvements to combine the various locking features which heretofore have been accomplished by separate devices under control of a number of locks in one common device, thus dispensing with the necessity of a number of controls and locks, together with multiplication of numerous small parts of the machine.

It is customary in cash registers of the class embraced by the present invention to have a cash drawer released during each operation of the machine, together with a device to compel the closing of the drawer before the machine can be again operated. This aids in enforcing the proper records because it will be obvious that if the cash drawer must be closed before the register can be used again, records of the transactions must be entered in the machine as they occur, and the proprietor's protection is more nearly complete. Under certain circumstances, it is occasionally desirable to operate the register irrespective of the position of the cash drawer and for this reason the invention provides a device under the control of a lever which, by its proper adjustment, permits the machine to be operated in another way. The control lever is locked by means of a lock and key, and by keeping the lock key in his possession the proprietor has full control at all times over this locking mechanism.

Cash registers as heretofore constructed have also been provided with a supplemental locking device for locking the cash register at will so as to prevent tampering with the machine or the records contained therein. It is an object of the present invention to incorporate such a locking mechanism with the locking devices controlled by the cash drawer, this mechanism also being placed under control of the control lever.

It is sometimes desirable to be able to release the cash drawer of the machine without operating one of the keys and it is a further object of the invention to incorporate mechanism for accomplishing this, this function being permitted by the proper adjustment of the control lever.

Cash registers as heretofore constructed usually have their interior mechanisms concealed by a cabinet to which are hinged various lids giving access to certain mechanisms, each lid usually being locked by means of different locks. In order to dispense with a multiplicity of locks the illustrative embodiment incorporates mechanism also under control of the control lever, whereby adjustment of this lever to a certain position will unlock all of the cabinet lids so that the proprietor may obtain access to all the mechanisms which furnish him the information to which he is entitled.

A novel type of unlocking mechanism for the various lids has been devised whereby the clerk, may under the control of one lock open one lid, but nevertheless be unable to open another lid. However, adjustment of the control lever to a predetermined position will release both of these lids. Various interlocks are also provided to prevent simultaneous operation of the total printing mechanism and the item entering mechanism, and the lock for the control lever is so arranged that the control lever may be locked in certain positions, but nevertheless may not be locked in others, and in the last mentioned positions the amount keys are locked against operation.

While the key of the lock which permits the adjustment of the control lever is usually retained by the proprietor it is the object of the present invention to provide a precautionary device whereby the proprietor will be able to ascertain whether or not any person has fraudulently obtained access to certain mechanisms. This comprises a counter which is actuated a unit each time the control lever is moved to a predetermined position.

The present invention comprises the construction of a cash register embodying the above-mentioned and other desirable features, the essential elements of which are set forth in appended claims and one embodiment of which is hereinafter described, with reference to the drawings which accompany and form part of this specification:

Of said drawings:—

Fig. 7 is a top plan view of the index plate and the general control lever.

Fig. 8 is a view of the lock for locking the control lever in certain positions taken on the section line 8—8 of Fig. 4.

Key banks

Figure 1:
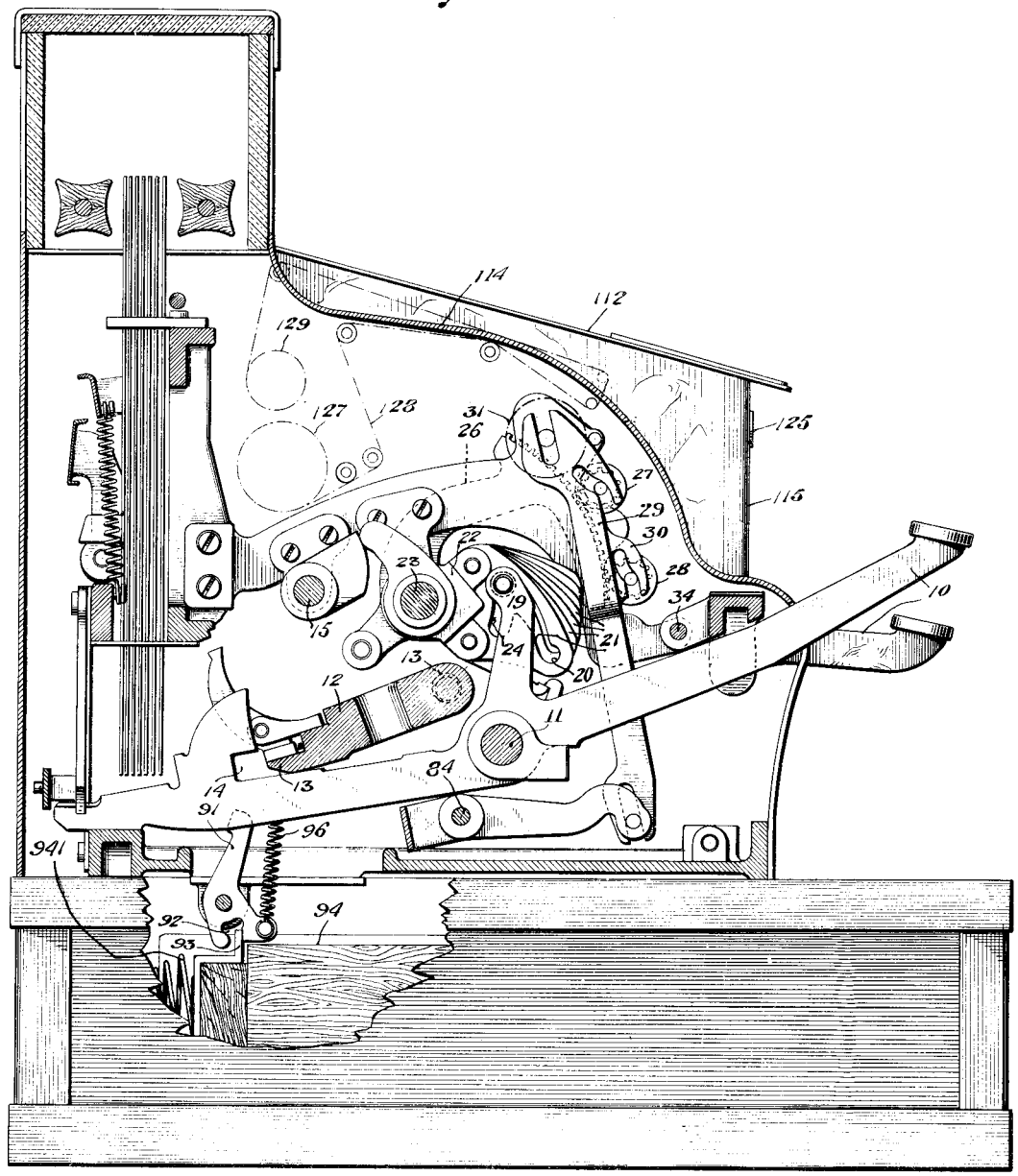
Fig. 1 is a vertical sectional view of the register embodying the present improvements and showing several amount keys, the associated key coupler, the differential mechanism and the operating segments for driving the totalizers.
Figure 3:
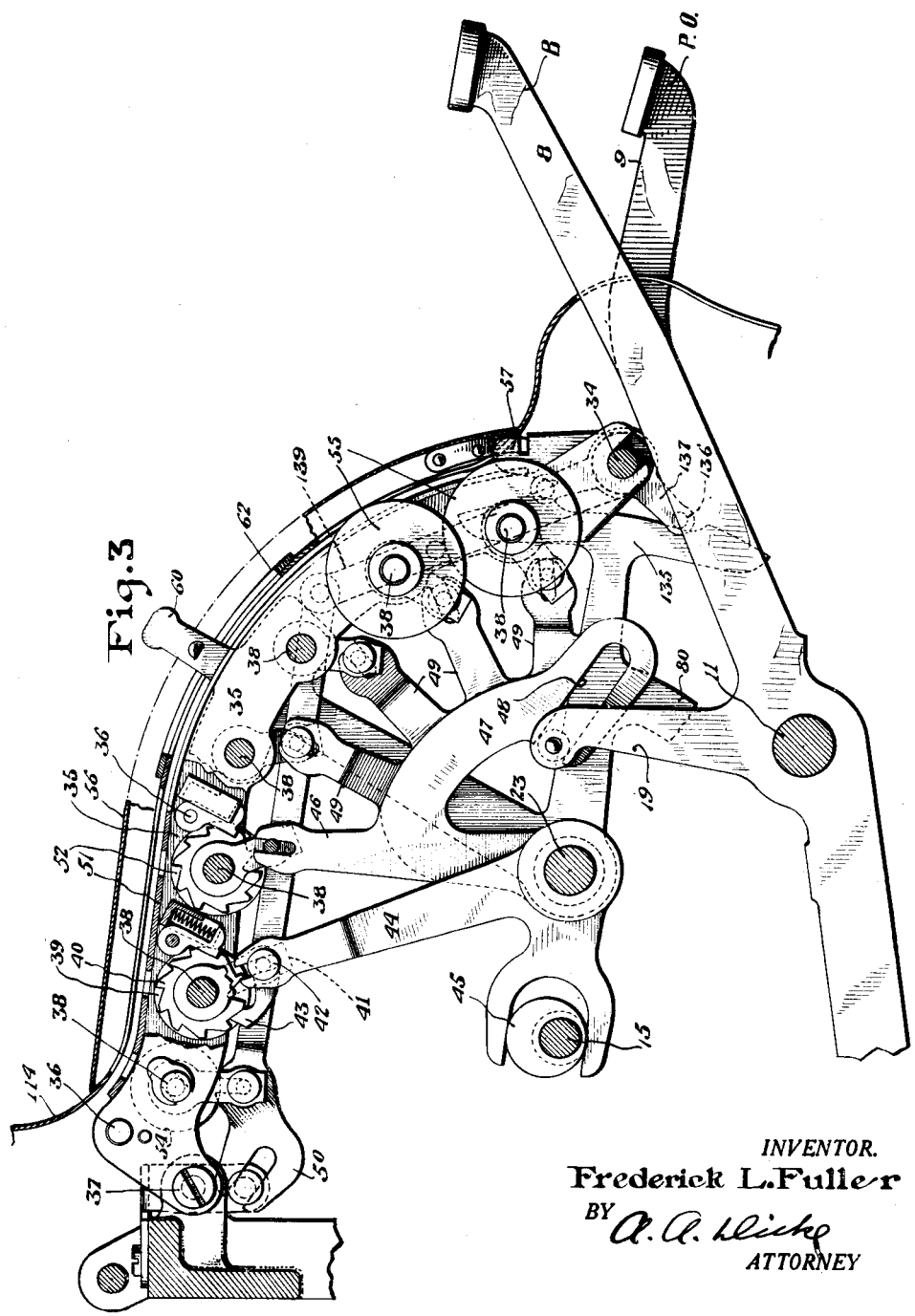
Fig. 3 is a partial sectional view showing the bank of special counters, and the connections from the different transaction keys, the rotation shaft and the lower lid by which the various special counters are operated.
Figure 6:
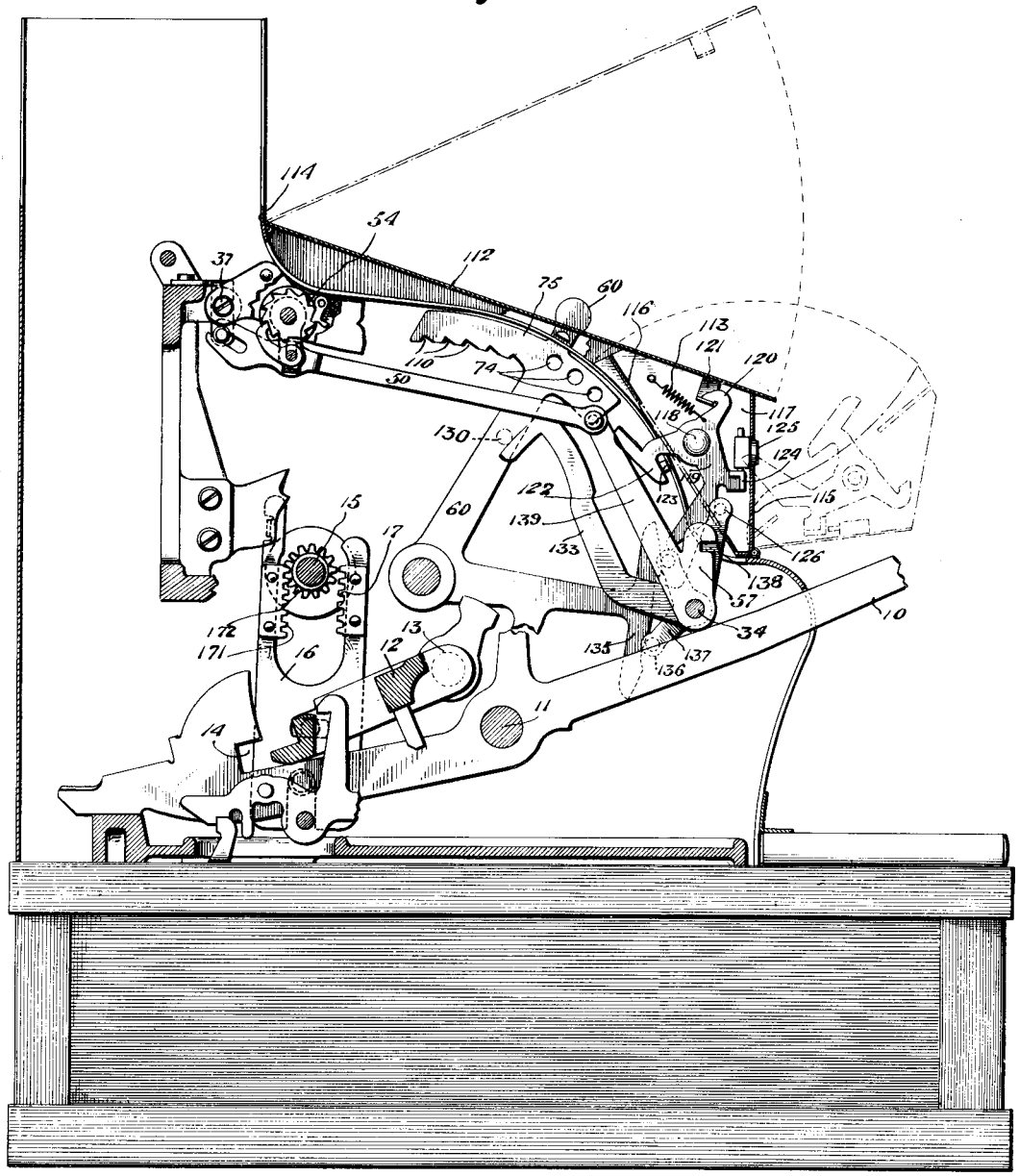
Fig. 6 is a vertical sectional view with a number of parts omitted for the sake of clearness showing the locks for the upper and front lid and the means under control of the general control lever for releasing both of these when adjusted to certain positions. This view also shows the devices for adding a unit to a special counter when the lower lid is opened.

The illustrative machine is provided with a plurality of keys, there being a number of groups of amount keys, a group of clerk's keys, and one group comprising a series of keys known in the art as "Transaction" keys, which denote the nature of the transaction entered in the machine. The amount keys are shown in Figs. 1 and 6 while one of the clerk's keys and a transaction key are shown in Fig. 3.

The amount keys 10 (Figs. 1 & 6) transaction key 9 and clerk's keys 8 (Fig. 5) are pivoted upon a shaft 11 extending transversely and journaled between the side frames of the machine. Resting upon the rear ends of the keys is a key coupler 12 journaled on an arbor 13 which extends between the machine side frames. When the outer ends of the keys are depressed the key coupler 12 is rocked clockwise and the nose 13 thereon enters notches 14 formed in the rear ends of the keys. The purpose of such key coupler mechanisms is well known in the art and need not be discussed herein in detail.

Driving mechanism

Extending transversely of the machine between the side frames is a shaft 15 designated as the main operating shaft. This shaft is given a complete rotation at each operation of the machine and carries cams and other devices for operating various parts of the mechanism. The mechanism for accomplishing this comprises a vertical reciprocable rack plate 16 (Fig. 6) pivotally connected to the key coupler 12 and provided with rack teeth 17 and 171 which alternately mesh with a gear 172 fast upon the operating shaft 15, as the key coupler is raised and lowered. In this manner a complete reciprocation of the key coupler 12 will effect a complete rotation of the main operating shaft 15. The mechanism for accomplishing this is not described herein in detail as one form which this mechanism might take is shown and described in detail in the parent application.

Differential mechanism

The differential mechanism or devices controlled by the various groups of keys for actuating the totalizers are all similar in construction and principle and a description of one will suffice for all. Each amount key 10 (Fig. 1) is provided with an upwardly extending arm 19 carrying a roller co-operating with slots 20 formed in a plurality of cam plates 21. The cam plates 21 are attached to a frame 22 mounted on a transverse supporting shaft 23. The cam plates are also provided with arcuate slots 24 which are concentric with respect to the shaft 23. The slots 20 are, however, graduated so that when the roller carried by the arm 19 of a depressed key plays in the slot 20 of its associated cam plate 21, it will move the frame 22 and attached parts a differential amount corresponding to the value of the key depressed. When the frame 22 is operated by the depression of a key, the rollers of the undepressed keys will play in the arcuate slots 24 of their respective cam plates 21 thereby permitting the frame 22 to be raised differentially without interfering with the rollers of the unoperated keys.

It is to be understood that there is a differential frame for each group of amount keys and one for the transaction keys as well.

Totalizer engaging mechanism

As shown in Fig. 1, the differentially moved frame 22 has pinned thereto a segmental rack 26 which is adapted to be meshed at the proper time with the pinions of a pivoted totalizer 27 or 28. To mesh the totalizer pinions with their related segmental racks 26 there is provided a plurality of totalizer engaging slides 29 and 30, either of which is adapted to be moved downwardly under control of its related clerk's key to cam its associated totalizer into engagement with the operating racks. Since the totalizer engaging mechanism forms no part of the present invention it is not shown or described in detail in the present application. A showing and description thereof may be found, however, in the parent application above identified.

Printing mechanism

Figure 2:
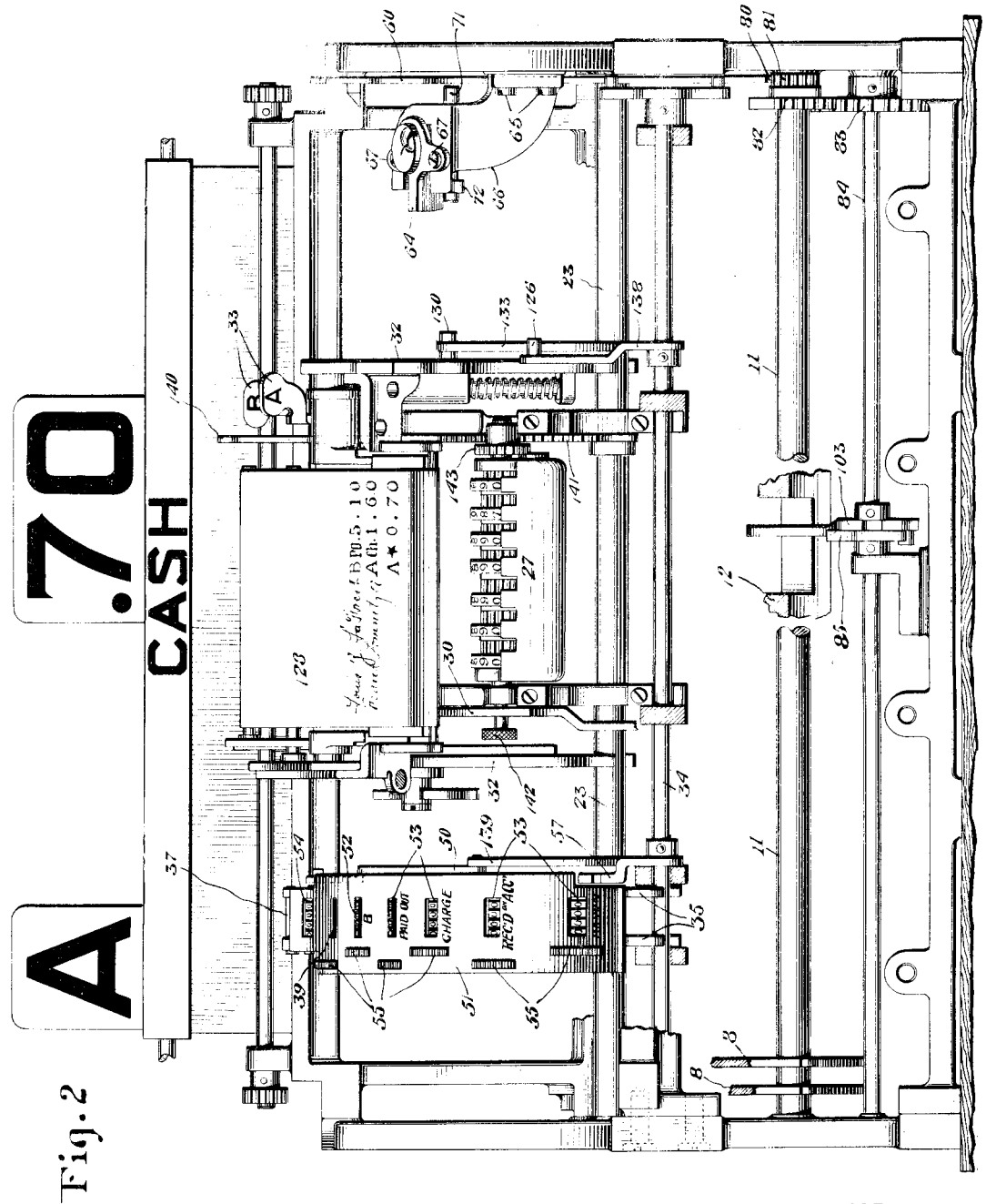
Fig. 2 is a front view of the machine with a number of parts omitted and shows the bank of special counters, one of the totalizers, and a portion of the record strip printing mechanism. This view also shows the general control lever and the connections for conditioning the machine so that it may be operated in different ways.

In continuous mesh with each segmental rack are pinions attached to amount and identifying character type carriers 31 (Fig. 1) adapted to print upon a record strip printing mechanism shown in Fig. 2. The printing mechanism is carried by frames 32 pivotally mounted on the shaft 23 and is normally in a position to take a printing impression from the type carriers when the latter are adjusted to positions determined by the depressed keys. The printing mechanism may, however, be rotated so that the platen and paper overlie the desired printing totalizer to take an impression therefrom. The means for accomplishing this is under a control of total printing levers 33 but movement of the printing frame by the levers 33 to print totals can only be accomplished when the general control lever is adjusted to a certain position. The details of construction of the means for printing items and totals are shown and described in the parent application above identified.

Special counters

In registers of this kind it has been often found desirable to provide counters to register the number of times certain operations and transactions are performed. In the present machine seven counters have been provided and assembled as a unitary structure so that they may be easily moved from or inserted in the machine.

Of these seven counters, four are under control of and operated by the four transaction keys, one is operated by one of the two clerks' keys, one is adapted to register the number of times the machine has been operated, and one indicates the number of times the machine has been conditioned to permit resetting of the totalizer. All of the special counters are covered by a shield which is suitably apertured for permitting the totals to be read and for permitting the resetting of the counter wheels to zero. In order to give access to these counters to read the totals and reset the same a cover hinged to the cabinet has been provided. The cover for the special counters is normally locked, and is only unlocked when the general control lever is adjusted to a certain position. At the close of a day's business the proprietor or other person of authority, by reference to the exposed special counters can, at a glance, determine the number of times each special key has been operated, the number of transactions made by either clerk and the number of times the machine has been reset.

The supporting frame for the counters consists of two side plates 35 (Fig. 3) connected together by suitable tie rods 36 forming a frame. The frame is bifurcated at its lower end to receive a transverse shaft 34 (see also Fig. 2) and is attached to the back frame of the machine by means of a pin 37. Extending between the side plates are seven counter wheel supporting shafts 38.

The construction of the various counters is substantially the same and for this reason will be sufficient to describe only one of them. The counter 39 (Fig. 3) for indicating the number of times the machine has been operated consists of the shaft 38 carrying suitable totalizer wheels, attached to each of which is a ratchet wheel 40. Pivotally mounted on the supporting shaft 38 is a bail 41 which carries a stud 42 upon which are pivotally mounted a plurality of spring-pressed actuating pawls 43 engaging the teeth of their related ratchet wheels 40. The engaging ends of the pawls 43 terminate in different planes, that is, the contacting ends of the pawls are successively different distances away from the ratchet wheel supporting shaft 38. These ends co-act with the notches formed in the ratchet wheel and also a deep notch therein. When a lower order wheel passes through the "9" position, the engaging end of its related pawl will drop into the deep notch thereby permitting the actuating pawl 43 corresponding to the next higher wheel to engage its ratchet wheel. In this manner when the bail 41 is operated a unit will be transferred to the wheel of the next higher order. This type of transfer mechanism is well known in the art and for this reason it is briefly explained herein.

Loosely mounted on the shaft 23 is a bell-crank 44 the vertical arm of which is slotted to receive the stud 42 carried by the bail of the counter 39. The horizontal arm of the bell-crank is bifurcated to engage a cam 45 attached to the rotation shaft 15. From the above it will be evident that when the bell-crank is oscillated at each operation of the machine a unit will be added to the counter 39 indicating the number of times that the machine has been operated.

The counter 52 which is forward of the counter 39 is operated by an arm 46, integral with which is a cam plate 47 provided with a cam slot 48 co-acting with a roller carried by the arm 19 of the "B" clerk's key 8. Each time that the "B" key 8 is operated the arm 46 will be oscillated to add a unit to this counter. The difference between the counter 39 and the "B" counter 52 represents the number of transactions made by the clerk "A".

The four lower counters 53 which are associated with the transaction keys are operated by a series of arms 49 having integral therewith cam plates (like the cam plate 47) pivotally mounted on the shaft 23. Each of these plates is provided with cam slots receiving rollers carried by the arms 19 of the different transaction keys 9. It will readily be understood that upon an operation of these transaction keys the corresponding arm 49 will be moved rearwardly resulting in the adding of a unit to the proper counter.

The counter 54 which is situated rearwardly is provided for indicating the number of times that the front lid has been opened to reset the machine. For actuating this counter there is provided a pitman 50 having connections to certain mechanism which will be described hereinafter.

The counter wheels are covered by a suitable shield 51 provided with properly spaced slots through which the totals standing on the counters may be read. In order to reset the counters to zero there is provided a series of knurled resetting wheels 55 projecting through slots in the shield 51 and serving to return the counter wheels to zero. Devices for accomplishing this are well known in the art and need not be described in detail.

In order to prevent unauthorized access to these counters the cabinet is provided with a lid 56 (Fig. 3) hinged to the cabinet and normally locked by a latch arm 57. The latch arm 57 is slotted to receive a portion of the lid 56 and is fast to the shaft 34. The unlocking of the lid 56 is possible only when the control lever, which may be manipulated only by the proprietor or other person carrying the key therefor, is moved to a certain position as will be described hereinafter.

*Control lever and associated mechanisms*

In machines of this kind it is usually the practice to provide a number of locks so that certain operations may be made and access had to certain parts of the machine by authorized persons only who are provided with keys for these locks. An improved mechanism has been provided for obtaining these results by the use of only two locks. One of these locks controls the upper lid of the machine, while the other lock controls the upper and lower lids, the special counter lid, and also the manner in which the machine may be operated.

It is also customary to provide a cash drawer which is forced outwardly during each operation of the machine under the action of a spring to expose the same for the purpose of making change or receiving the money tendered. It is desirable at times to have mechanism so arranged that it will be necessary to close the cash drawer at the end of each operation thereby rendering its contents inaccessible between successive operations. The purpose of such construction is to compel the operator of the machine to make some record before access to the money contained in the drawer may be had. At other times it is often desirable to disable the mechanism just described so as to permit of an operation of the machine during rush hours without closing the cash drawer after each operation. It is further advantageous that at the end of a day's business, the proprietor or authorized persons be capable of locking the register against any operation.

In order to perform these functions the illustrative embodiment is provided with a general control lever which may be locked in different positions for locking the register, or for operating it in different ways. In addition to the above mentioned functions, the general control lever when adjusted to a certain position, will unlock the different lids to permit the proprietor to obtain access to the total printing mechanism, the resetting devices and the special counters. Movement of the control lever to another position will release the drawer so that the contents therein may be exposed.

Figure 4:
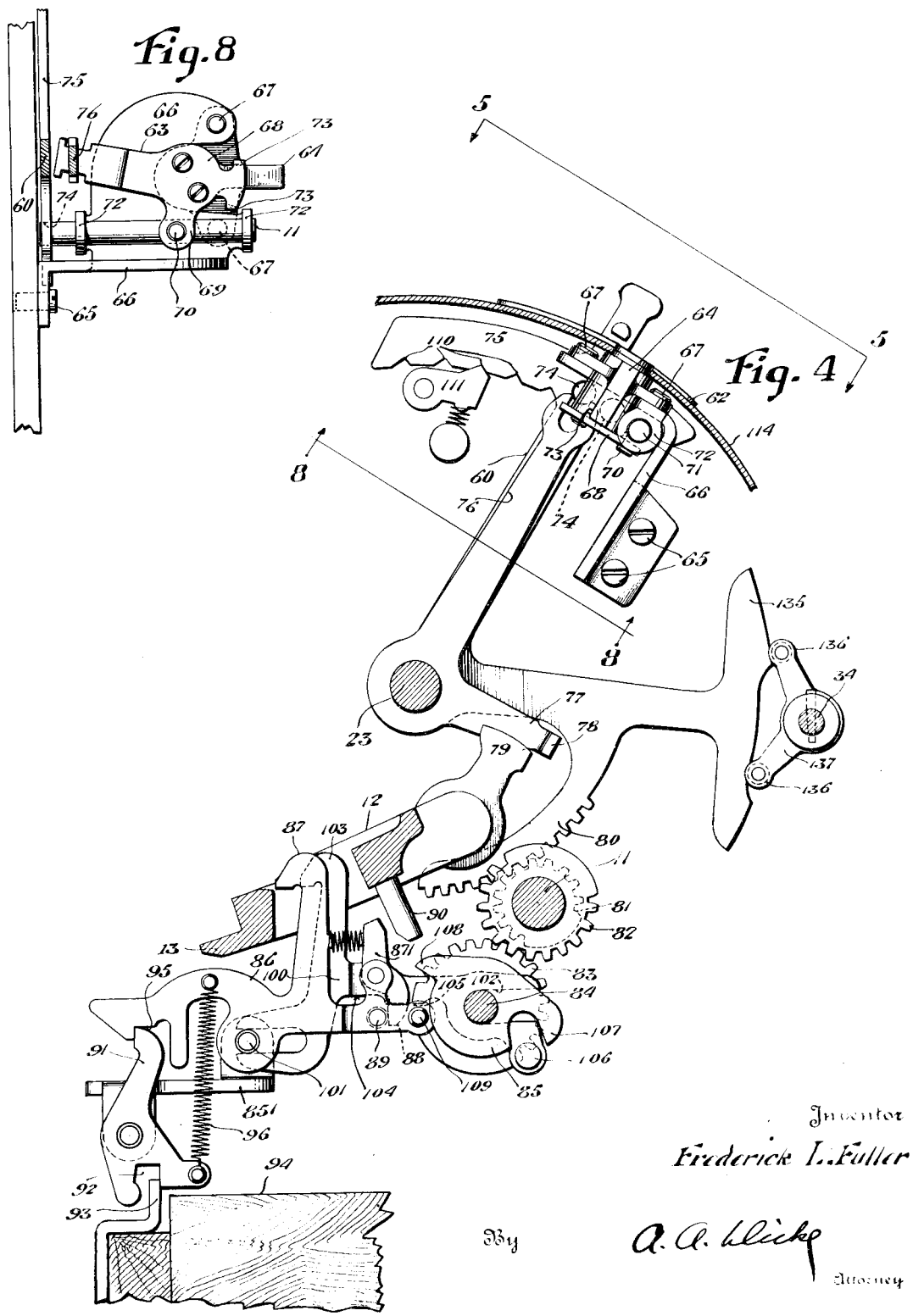
Fig. 4 is a view in side elevation showing in detail the general control lever, the associated locking and controlling devices and the lock for locking the control lever in its adjusted position.

To accomplish these results the machine has been provided with a control lever 60 which as shown in Fig. 4 is loosely pivoted upon the shaft 23 and movable in a slot 61 (Fig. 7) formed in an index plate 62 attached to the cabinet of the register, and bearing at the proper points the words "Lock register",—"Open drawer",—"Closed drawer",— "Total and Reset", and "Release drawer".

In order to lock the control lever 60 in its adjusted position there has been provided a lock 64 attached to the inside of the cabinet. The lock is attached by screws 67 (Figs. 2 and 8) to a bracket 66 which in turn is secured to the machine side frame by screws 65. The lower portion of the lock has attached a plate 68 (Fig. 8) having an arm 69 apertured to receive a pin 70 carried by a slidable bolt 71 which is mounted in ears 72 integral with the bracket 66. When the key is inserted in the lock and rotated the bolt 71 will be reciprocated, its movement being limited by stop lugs 73 (Figs. 5 and 8) bearing against a portion of the lock body 64. The bolt 71 may be received and locked in any one of three holes 74 (Fig. 6) formed in an extension 75 of the lever 60.

The plate 68 is furthermore provided with an arm 63 received by a slot formed in the upper end of a bell-crank 76 (Fig. 4) loosely mounted upon the shaft 23. The horizontal arm 77 of the bell-crank 76 is provided with a locking lug 78 adapted to co-operate with a projection 79 integral with the key coupler 12. In the position shown the locking lug 78 will clear the projection 79 and permit the machine to be operated. Whenever the lever is not properly locked up in its adjusted position by the retention of the key in the lock, the lug 78 will be so disposed that it will pass in front of the projection 79 and prevent an operation of the machine. This device effectively locks the machine against operation if the control lever 60 is not properly locked in its adjusted position. As previously set forth three holes are provided for locking the control lever in its three lowermost positions, but no holes are provided for receiving the bolt 71 when the locking lever is in its fourth or fifth positions. It will, therefore, be impossible to operate the machine when the lever is adjusted to the two rearmost positions since the lug 78 is in the path of the extension 79 of the key coupler 12.

In order to aline the locking lever in its variously adjusted positions the plate 75 is provided with notches 110 (Fig. 4) engaging a spring-pressed pawl 111 pivoted to the frame of the machine.

The lever 60 is provided with a gear sector 80 (Figs. 4 and 5) meshing with a gear 81 loose on the right hand end of the shaft 11. Attached to the gear 81 is a somewhat larger gear sector 82 meshing with another gear sector 83 fast on a transverse shaft 84 journaled between the side frame of the machine. Attached to the shaft 84 is a disc 85 capable of being moved to different positions by adjustment of the control lever 60.

Pivoted by a pin 101 to a bracket 851 attached to the base of the machine is a drawer catch release lever 86 provided with an upwardly extending hook 87 adapted to engage and hook over a portion of the key coupler 12. The forward portion of the drawer catch release lever has pivoted thereto an upwardly extending spring-pressed pawl 871 having a tail 88 bearing against a pin 89 carried by the drawer catch release lever 86.

The key coupler 12 is provided with a downwardly extending trip arm 90 in line with the pawl 871. Pivoted to the bracket 851 is a drawer catch 91 provided with a notch 92 receiving a bracket 93 carried by the rear end of the cash drawer 94 which is urged outwardly by a spring 941 (Fig. 1). The upper end of the drawer catch 91 is adapted to engage a notch 95 formed on the rear end of the drawer catch release lever 86, and between the drawer catch and release lever is a spring 96.

The operation of the drawer releasing device thus described is as follows: During the down stroke of the keys the coupler is moved upwardly and the trip arm 90 forces the spring-pressed pawl 871 rearwardly until the trip arm clears the pawl whereupon it will again assume its forward or normal position. During the return movement of the keys the coupler will descend and the lower edge of the trip pawl 90 contacting with the pawl 871 will rock the drawer catch release lever 86 about its pivotal point 101 thereby disengaging the notch 95 from the upper end of the drawer catch 91. The spring 96 will rotate the drawer catch 91 counter-clockwise and disengage the notch 92 from the bracket 93 thereby permitting the drawer to be expelled outwardly under the influence of the spring 941.

*"Closed drawer" position of control lever*

The mechanism in Fig. 4 is shown with the parts adjusted in such a way that it is necessary to close the drawer between successive operations of the machine. It will be clear that when the drawer 94 is forced outwardly the rear end of the drawer catch release lever 86 will no longer be supported by the drawer catch 91 and the spring 96 will rotate the drawer catch release lever counter-clockwise and causing the hook 87 to overlie the key coupler 12. The machine will now be locked against a subsequent operation until the drawer is again closed and the hook 87 returned to the position shown in Fig. 4.

*"Lock register" position of control lever*

Figure 5:
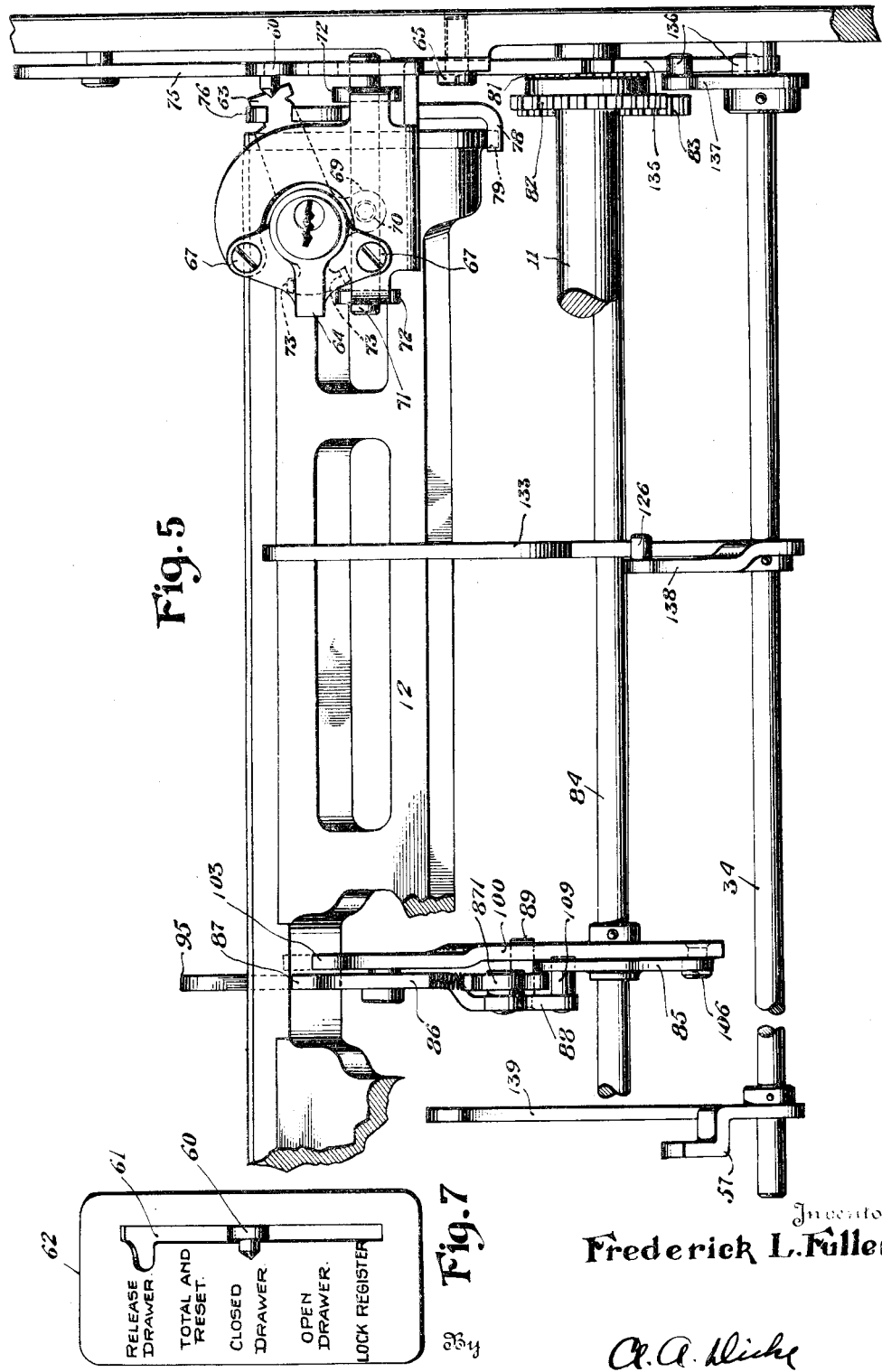
Fig. 5 is a plan view on the line 5—5 of Fig. 4 showing the key coupler and the mechanism for locking it against operation.

It is sometimes necessary to lock the register mechanism and keys against any operation during the absence of clerk or proprietor and in order to effectively lock the present machine against any unauthorized operation the control lever 60 is moved downwardly to its lowest position until the pointer is opposite the words on the index plate indicating "lock register" position. The mechanism for accomplishing this comprises a a locking slide 100 (Figs. 4 and 5) which is bifurcated at its rear end to engage the pin 101 of the drawer catch release lever and at its forward end is formed with an open slot 102 embracing the shaft 84. The locking slide is formed with a hook 103 adjacent the hook 87 and adapted to hook over the coupler. The lower edge of the slide 100 is provided with a notch 104 and a horizontal edge 105, either of which is adapted to register with the pin 89 which as is shown in Fig. 5 is lengthened sufficiently to co-act with the lower edge of the locking slide 100. The locking slide 100 is, furthermore, provided with a stud 106 in the path of a projection 107 on the disk 85.

When the lever is unlocked and moved two steps to its lowermost or "lock register" position the movement of the control lever 60, will, through the train of mechanism previously described, rotate the shaft 84 and the disc 85 clockwise as viewed in Fig. 4. The clockwise movement of the disk 85 will force the projection 107 against the stud 106 and positively move the locking slide 100 rearwardly causing its hook 103 to overlie the key coupler and lock the machine against operation.

"Open drawer" position of control lever

It will be noted from Fig. 4 that the pin 89 is so positioned that it registers with the notch 104 of the locking slide permitting the hook 87 to overlie the key coupler 12 when the drawer is opened. If, however, the control lever 60 is moved downwardly one step from the position shown in Figs. 4 and 7, that is to the "open drawer" position, the disk 85 will be rotated clockwise and the projection 107 bearing against the stud 106 will force the locking slide rearwardly a slight amount, sufficient to bring the horizontal edge 105 over the pin 89 but not sufficient to bring the hook 103 over the key coupler. When in this position the pin 89 contacting with the horizontal edge 105 will prevent the hook 87 from engaging the key coupler when the drawer is either open or closed. It will, therefore, be possible to operate the machine with the drawer either open or closed.

"Release drawer" position of control lever

If the control lever is moved to its rearmost position so that the pointer is adjacent the words "Release drawer" on the index plate, the cash drawer will be released so that the proprietor can extract the money or contents from the cash drawer. When the control lever is moved to this position the disc 85 is given a sufficient counter-clockwise movement to bring another projection 108 to bear against a stud 109 carried by the forward end of the drawer catch release lever 86. This will rotate the drawer catch release lever clockwise and permit the drawer to be released in the usual way. This is a convenient means for permitting the proprietor at any time and for any reason whatsoever, to obtain access to the cash drawer without operating the register.

"Total and reset" position of control lever

At the end of a day's business or any other arbitrary period, the proprietor generally obtains the information pertaining to the business transacted during the period, such as the totals accumulated by the totalizers, the amount standing on the item counters, and then usually resets the totalizers and the various item counters to zero. The means whereby only the proprietor can obtain access to the total printing and resetting mechanisms to obtain this information and accomplish the resetting function comprises devices controlled by the lever 60, in such a way as to permit access when said lever is moved to "total and reset" position.

Said devices are associated with the lid or cover locks. As more fully set forth in the Fuller application Ser. No. 263,125 the printing mechanism is concealed by means of a lid 112 (Figs. 1 and 6) located in the central part of the machine, hinged to the cabinet 114 at its rearward end and provided with a glass through which the printed items are visible. By lifting up this lid access may be had to the printer when it is necessary to replenish the supply of paper. Also located in the central part of the machine is a second lid 115 hinged to the cabinet 114 and equipped with a shield or cover 116 overlying the totalizers.

It is desirable, of course, to have the locks for the various lids so constructed that a clerk may be able to open the lid 112 for replenishing the record paper supply, but he should not be able to open the lid 115 which would give him access to the totalizers. The details of the novel mechanism devised to accomplish the desired results will now be set forth.

Secured to the side plate 117 of the front lid 115 by a pin 118 is a locking spider 119 urged rearwardly by a spring 113. The spider 119 comprises an upwardly extending hook 120 engaging a locking lug 121 secured to the upper lid 112 and a downwardly extending hook 122 engaging a lug 123 carried by the cabinet 114. As shown in Fig. 6, the hook 120 is somewhat shorter than the hook 122 so that if the spider is rocked clockwise slightly, it will permit the opening of the upper lid 112, but the hook 122 will not have been released from the locking lug 123 and will not, therefore, permit opening of the lower lid 115. For the purpose of permitting this partial rocking of the locking spider 119 there is integral with the spider a lug 124 suitably disposed underneath a bolt of a lock 125 attached to the lid 115. The travel of the bolt is sufficient to actuate the lug 124 to rock the spider 119 to withdraw the hook 120 from the lug 121, but not sufficient to withdraw the hook 122 from the lug 123. It will be clear that the clerk or whoever is provided with the key of the lock 125 will be able to gain access to the upper lid to replenish the supply of the paper, etc., but cannot gain access to the totalizers or the printing mechanism to obtain the totals standing on the totalizers and, if it should be attempted to rock the spider 119 further clockwise to disengage the hook 122 from the lug 123 to unlock the lid 115, it will be prevented by the contact of the lug 124 with a pin 126.

The position of the record strip paper is indicated in Fig. 1. The strip 128 is drawn from the supply roll 127 under and over the platen to the storage roll 129. As just stated, lifting of the upper lid 112 will give access to the paper supporting devices when it is necessary to replenish the supply of paper.

The total printing levers 33 (Fig. 2) are located beneath the lid 112 so that any body who is able to open up the lid 112 may have access to the printing levers, but in order to prevent unauthorized persons from obtaining the printed totals one of the side plates 32 of the printer frame is provided with a stud 130 (Figs. 2 and 6) which normally lies in the path of an obstructing arm 133 secured to the shaft 34.

It is also desirable that the clerk be unable to read the totals standing upon the item counters and for this reason the various counters are covered by means of a curved lid 56 (Fig. 3) hinged to the cabinet 114 and provided with a lug normally engaging a notch in the locking arm 57 attached to the shaft 34.

Releasing of the item counter lid 56, the front lid 115, and unlocking of the total printing mechanism is under control of the control lever by mechanism which will now be described.

When the control lever is set to the "total and reset" position the segment 80 will be rocked counter-clockwise, from the position shown in Fig. 4 so that a cam plate 135 cooperating with rollers 136 carried by a bellcrank 137 attached to the shaft 34 will rock said shaft counter-clockwise (Figs. 4 and 6) so that an arm 138 (Fig. 6) attached to the shaft 34 will be rocked rearwardly, and by means of the stud 126 engaging a portion of the spider 119 will rock it sufficiently far enough to disengage both hooks from their associated lugs, releasing the lids 112 and 115. Simultaneously the latch 57 for the special counter lid will be rocked rearwardly so as to unlock the special counter lid and at this point in the operation, all of the lids of the machine will be unlocked. The counter-clockwise rotation of shaft 34 likewise carries the arm 133 downwardly bringing it out of engagement with the stud 130 carried by the printer frame thus permitting the printing mechanism to be rocked downwardly under control of the printing levers for printing the totals from either totalizer.

As stated heretofore, it is not possible to lock the control lever in the "total and reset" position, and since the lug 78 (Fig. 4) is in the path of the extension 79 of the key coupler the operating mechanism will be locked as long as the control lever is in the "total and reset" position. This prevents a simultaneous operation of the total printing mechanism and the item entering mechanism.

In registers of the class embraced by the present invention it is desirable to provide means for indicating the number of times that the machine has been conditioned for resetting and to this end a special counter is provided designated as the "Reset counter" 54 (see Fig. 6) which is of the conventional type and is actuated by means of an arm 139 attached to the pitman 50. It will be obvious, therefore, that each time that the control lever is brought to the "reset" position a unit is added to the "reset" counter.

After obtaining the information standing upon the totalizers, it is desirable to reset the totalizers to zero and to this end the machine is provided with a resetting segment 140 (Fig. 2) loosely mounted upon the shaft 23 and provided with a segmental rack portion 141. The totalizer wheel supporting shaft is provided with a knurled knob 142 and a pinion 143 and the totalizer elements are arranged to be connected to the shaft to be reset by its rotation when the shaft is moved longitudinally in a manner well known in the art. In the illustrative embodiment the necessary longitudinal movement, which also engages pinion 143 with segment 141, is effected by manipulation of the knob 142, and the rotation of the shaft is then effected by drawing the segment 140 downwardly. While the resetting segment 140 is located under the lid 112 accessible to the operator of the machine, he cannot perform the resetting function since it requires a manipulation of the knurled knob 142 and this is prevented as long as the front lid 115 is in its normal position. Resetting of the transaction and customer counters is performed by means of the knurled wheels 55 in a manner well known in the art. The reset counter 54 is not adapted to be reset to zero and it will continue to accumulate units each time the control lever is moved to the "total and reset" position.

The operation of the devices having been set out in such detail in the foregoing description of the mechanism, a summary of the operation is thought to be superfluous.

While the form of mechanism herein shown and described is admirably adapted to fulfill the objects of the invention, it is to be understood that it is illustrative rather than restrictive, and that the invention is not limited thereto as it is susceptible of embodiment in various forms, all coming within the scope of the claims which follow.

What is claimed is:

1. In a cash registering machine, of the type having a cash drawer and means for releasing the drawer when the machine is operated, a control lever and means connected thereto so constructed and arranged that when the lever is in one position the machine may be operated when the drawer is open and when the lever is in the second position the machine is locked against operation until the drawer is closed, while movement of the lever to a third position effects the opening of the drawer.

2. In a cash registering machine of the type having keys and a key coupler, a cash drawer and means for releasing the drawer when the machine is operated, a control lever and means connected thereto and associated with said key coupler so constructed and arranged that when the lever is in one position the machine may be operated when the drawer is open, when the lever is moved to a second position the machine is locked against operation until the drawer is closed and when the lever is moved to a third position, the machine is locked against operation, said lever being accessible for direct manipulation by the operator to any of said positions.

3. In a cash registering machine of the type having a cash drawer and means for releasing the drawer when the machine is operated, a control lever and means connected thereto so constructed and arranged that when the lever is in one position the machine may be operated when the drawer is open, when the lever is moved to a second position the machine is locked against operation until the drawer is closed while movement of the lever to a third position effects the opening of the drawer, and a lock for retaining the lever in any desired position.

4. In a cash registering machine of the type having a cash drawer and means for releasing the drawer when the machine is operated, a control lever and means connected thereto so constructed and arranged that when the lever is in one position the machine may be operated when the drawer is open, when the lever is moved to a second position the machine is locked against operation until the drawer is closed while movement of the lever to a third position effects the opening of the drawer and movement of the lever to a fourth position effects the locking of the register against operation.

5. In a cash registering machine of the type having a coupler actuated at each operation of the machine and a cash drawer, a catch for holding the drawer in closed position, a drawer catch release lever actuated by the coupler and provided with a hook normally adjacent the coupler, a spring tending to force the hook to engage the coupler, said catch being so positioned as to normally prevent the hook from engaging the coupler, but to permit the hook to engage the coupler when the drawer is open.

6. In a cash registering machine of the type having a coupler actuated at each operation of the machine and a cash drawer, a lever for holding the drawer in closed position provided with a hook adjacent the coupler, a spring tending to engage the hook with the coupler and means to prevent engagement of the hook with the coupler when the drawer is closed.

7. In a cash register machine of the type having a coupler actuated at each operation of the machine and a cash drawer, a lever for holding the drawer in closed position provided with a hook adjacent the coupler, a spring tending to engage the hook with the coupler and means to prevent engagement of the hook with the coupler when the drawer is closed, and adjustable means to prevent the engagement of the hook with the coupler when the drawer is open.

8. In a cash registering machine of the type having a coupler actuated at each operation of the machine and a cash drawer, a lever for holding the drawer in closed position provided with a hook adjacent the coupler, a spring tending to engage the hook with the coupler and means to prevent engagement of the hook with the coupler when the drawer is closed, and slidable means for preventing engagement of the hook with the coupler in a certain position.

9. In a cash registering machine the combination of a key coupler actuated at each operation of the machine, a movable control member, a lock for detaining said member in any of a plurality of positions, and an obstacle under the control of the lock movable into the path of the coupler when desired.

10. In a cash registering machine of the type having a coupler actuated at each operation of the machine and a cash drawer, a lever for holding the drawer in closed position provided with a hook adjacent the coupler, a spring tending to engage the hook with the coupler and means to prevent engagement of the hook with the coupler when the drawer is closed, and a slide for preventing engagement of the hook with the coupler when in a certain position, said slide being formed with a recess normally located to receive an extension on the lever so as to permit the hook to engage the coupler.

11. In a cash registering machine of the type having a coupler actuated at each operation of the machine and a cash drawer, a lever for holding the drawer in closed position provided with a hook adjacent the coupler, a spring tending to engage the hook with the coupler when the drawer is open, and a slide for preventing engagement of the hook with the coupler when in a certain position, said slide being formed with a recess and a projection, a lug on the lever, and means for moving the slide so as to bring either the recess or the projection in line with the lug.

12. In a cash register machine of the type having a coupler actuated at each operation of the machine and a cash drawer, a lever for holding the drawer in closed position, provided with a hook adjacent the coupler, a spring tending to engage the hook with the coupler when the drawer is open, and a slide for preventing engagement of the hook with the coupler when in a certain position, said slide being formed with a recess and a projection, a lug on the lever, and means for moving the slide so as to bring either the recess or the projection in line with the lug, and a hook on the slide in a position to engage the coupler.

13. In a cash registering machine of the type having a coupler actuated at each operation of the machine and a cash drawer, a lever for holding the drawer in closed position provided with a hook adjacent the coupler, a spring tending to engage the hook with the coupler when the drawer is open, and a slide for preventing engagement of the hook with the coupler when in a certain position, said slide being formed with a recess and a projection, a lug on the lever, and means for moving the slide so as to bring either the recess or the projection in line with the lug, said means having a projection engageable with the lever for actuating the same.

14. In a cash registering machine, a control lever and a lock comprising a transversely sliding bolt for holding said lever in one of several predetermined positions, and means to prevent operation of the machine when the lever is unlocked.

15. In a cash registering machine, a control lever and a lock comprising a transversely sliding bolt for holding said lever in one of several predetermined positions, and means to prevent unlocking the lever when the machine is in partly operated position.

16. In a cash registering machine, a control lever and a lock comprising a transversely sliding bolt for holding said lever in one of several predetermined positions, and means to prevent operation of the machine when the lever is unlocked and for preventing unlocking the lever when the machine has been partly operated.

17. In a cash register, the combination of an operating member, a pivoted locking element for the operating member, a slidable locking element for the operating member, and means whereby the effectivity of the locking of the operating member by the pivoted locking element is controlled by the slidable locking element.

18. In a cash register, the combination of an operating member, of a pair of locking members therefor, one pivoted and the other slidable, and means whereby one controls the other.

19. In a cash register, the combination of a key coupler, a cash drawer, a drawer catch therefor, means controlled by the key coupler for operating the drawer catch to release the cash drawer, and a hook integral with the drawer catch for locking the key coupler when the drawer is released.

20. In a cash register, the combination of an operating member, a cash drawer, a drawer catch release lever, a drawer catch disabled by the drawer catch release lever, a locking element integral with the drawer catch release lever adapted to lock the operating member, the parts being so arranged and constructed that when the cash drawer is in its normal position the drawer catch will retain the locking element out of locking relationship with the operating member.

21. In a cash register, the combination with a series of keys, a member movable by said keys, a cash drawer, a drawer catch and a drawer catch release lever adapted to disable the drawer catch to release the cash drawer, and lock the movable member.

22. In a cash register, the combination with a series of keys, a member movable by said keys, a cash drawer, a drawer catch, a drawer catch release lever adapted to disable the drawer catch to release the cash drawer and lock the movable member, and a manipulative device for preventing the drawer catch release lever from locking the movable member when the drawer is opened.

23. In a cash register, the combination with a series of keys, a member movable by the keys, a cash drawer, means controlled by the movable member for releasing the cash drawer and a differentially positioned manipulative device for controlling said movable member and for operating said means to release the cash drawer independently of the movable member.

24. In a cash register, the combination with a series of keys, a member movable by the keys, a cash drawer, means controlled by the movable member for releasing the cash drawer, a differentially positioned disc adapted to control said movable member and to operate said means to release the cash drawer independently of the movable member and a lever for differentially positioning the disc.

25. In a cash register, the combination with a series of keys, of a member movable by the keys, a cash drawer, means controlled by the movable member for releasing the cash drawer, locking devices whereby the movable member is locked when the cash drawer is released, a lever for restraining at will the effectivity of the locking devices, said lever having connections to release the cash drawer independently of the movable member.

26. In a cash register, the combination with a series of keys, of a member movable by the keys, a cash drawer, means controlled by the movable member for releasing the cash drawer, locking devices whereby the movable member is locked when the cash drawer is released, a lever for restraining at will the effectivity of the locking devices when adjusted to a predetermined position, said lever having connections to release the cash drawer independently of the movable member when adjusted to another predetermined position, and means whereby the keys are locked against operation when the lever is adjusted to the last mentioned position.

27. In a cash register, the combination with a series of keys, of a member movable by the keys, a cash drawer, means controlled by the movable member for releasing the cash drawer, locking devices whereby the movable member is locked when the cash drawer is released, a lever for restraining at will the effectivity of the locking devices when adjusted to a predetermined position, said lever having connections to release the cash drawer independently of the movable member when adjusted to another predetermined position, means whereby the keys are locked against operation when the lever is adjusted to the last mentioned position, and interlocking devices whereby the lever may not be moved from its adjusted position while the keys are being operated.

28. In a cash register, the combination with a series of keys, a cash drawer, locking devices for locking the keys when the cash drawer is opened, a lever for restraining the effectivity of the locking devices, and connections from the lever for positively locking the keys irrespective of the position of the first mentioned locking devices and cash drawer.

29. In a cash register, the combination with a series of keys, a movable member operated by the keys, a control lever pivoted upon a shaft, an adjacent locking lever also pivoted upon the shaft, a lock for locking the control lever in any adjusted position and means whereby the lock actuates the locking lever to lock the movable member when the control lever is unlocked.

30. In a cash registering machine of the type having keys and a key coupler, a cash drawer and means for releasing the drawer when the machine is operated, a control element, means associated with said element and said coupler and so constructed and arranged that when said element is in one position the machine may be operated when the drawer is open, when said element is moved to a second position the machine is locked against operation until the drawer is closed and when said element is moved to a third position the machine is locked against operation, and a manipulative member for moving said element to any of said positions.

31. In a cash registering machine of the type having keys and a key coupler, a cash drawer and means for releasing the drawer when the machine is operated, a control lever, means associated therewith and with said coupler and so constructed and arranged that when said lever is in one position the machine may be operated when the drawer is open, when said lever is moved to a second position the machine is locked against operation until the drawer is closed and when the lever is moved to a third position the machine is locked against operation, and key controlled locking means for locking said lever against movement in said second mentioned position.

32. In a cash registering machine of the type having keys and a key coupler, a cash drawer and means for releasing the drawer when the machine is operated, a control lever having at least a portion thereof outside the machine, and means associated with said lever and with said coupler and so constructed and arranged that when said lever is in one position the machine may be operated when the drawer is open, when said lever is in another position the machine is locked against operation until the drawer is closed and when the lever is moved to a third position the machine is locked against operation.

33. In a cash registering machine, the combination of a key coupler actuated at each operation of the machine, a movable control member, a lock for said member and an obstacle under control of said lock and movable into the path of the coupler when said member is unlocked.

34. In a cash registering machine of the type having a coupler actuated at each operation of the machine and a cash drawer, a control lever and a lock for detaining the lever in any of several positions, an obstruction to the coupler under control of the cash drawer, a second obstruction to the coupler, a third obstruction to the coupler controlled by the lock, and means whereby the effectiveness of said obstructions is controllable by said lever.

35. In a cash registering machine of the type having keys and a key coupler, a cash drawer and means for releasing the drawer when the machine is operated, a control lever and means connected thereto and associated with said key coupler so constructed and arranged that when the lever is in one position the machine may be operated when the drawer is open, when the lever is moved to a second position the machine is locked against operation until the drawer is closed, and when the lever is moved to a third position the machine is locked against operation, and means for holding the lever in the said second-mentioned position regardless of the position of the drawer.

In witness whereof I have signed my name hereto this 23rd day of April, 1926.

FREDERICK L. FULLER.